(12) United States Patent
Okudo et al.

(10) Patent No.: US 12,542,241 B2
(45) Date of Patent: Feb. 3, 2026

(54) CAPACITOR AND MANUFACTURING METHOD THEREOF

(71) Applicant: Panasonic Intellectual Property Management Co., Ltd., Osaka (JP)

(72) Inventors: Takafumi Okudo, Osaka (JP); Hiroki Takeoka, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 254 days.

(21) Appl. No.: 18/314,172

(22) Filed: May 9, 2023

(65) Prior Publication Data
US 2023/0326675 A1 Oct. 12, 2023

Related U.S. Application Data

(63) Continuation of application No. PCT/JP2021/041252, filed on Nov. 9, 2021.

(30) Foreign Application Priority Data

Dec. 2, 2020 (JP) .................. 2020-200497

(51) Int. Cl.
*H01G 4/224* (2006.01)
*H01G 4/012* (2006.01)
*H01G 4/32* (2006.01)

(52) U.S. Cl.
CPC ............. *H01G 4/224* (2013.01); *H01G 4/012* (2013.01); *H01G 4/32* (2013.01)

(58) Field of Classification Search
CPC ........... H01G 4/32; H01G 4/012; H01G 4/224
(Continued)

(56) References Cited

U.S. PATENT DOCUMENTS

| 3,452,257 A | * | 6/1969 | Belko, Jr. | ............... | H01G 4/232 361/308.1 |
| 4,221,033 A | * | 9/1980 | Kobayashi | ............. | H01G 4/248 29/25.42 |

(Continued)

FOREIGN PATENT DOCUMENTS

| JP | 62-199926 U | 12/1987 |
| JP | 2006-294788 | 10/2006 |

(Continued)

OTHER PUBLICATIONS

International Search Report of PCT application No. PCT/JP2021/041252 dated Feb. 1, 2022.

*Primary Examiner* — Arun Ramaswamy
(74) *Attorney, Agent, or Firm* — Rimon P.C.

(57) ABSTRACT

A capacitor includes a capacitor element and a protection film. The capacitor element includes a first end-face electrode, a second end-face electrode, and an outer peripheral surface. The second end-face electrode exists on the opposite side of the first end-face electrode. The outer peripheral surface exists between the first end-face electrode and the second end-face electrode. The protection film includes a first protection portion, a second protection portion, and a third protection portion. The first protection portion protects the periphery of the first end-face electrode. The second protection portion protects the periphery of the second end-face electrode. The third protection portion is connected to the first and second protection portions and protects the outer peripheral surface.

5 Claims, 7 Drawing Sheets

(58) Field of Classification Search
USPC .............................................. 361/304, 301.5
See application file for complete search history.

(56) References Cited

U.S. PATENT DOCUMENTS 4,959,652 A * 9/1990 Hirama ................ H01G 4/2325
                                                                                29/25.42
5,912,796 A * 6/1999 Price ...................... H01G 4/232
                                                                                 361/306.3

FOREIGN PATENT DOCUMENTS

| JP | 2016-157755 | 9/2016 | |
|---|---|---|---|
| JP | 2016-207828 | 12/2016 | |
| JP | 2020-136518 | 8/2020 | |
| WO | WO-2020137033 A1 * | 7/2020 | ............. H01G 2/103 |

* cited by examiner

CAPACITOR AND MANUFACTURING METHOD THEREOF

BACKGROUND

1. Technical Field

The present disclosure relates generally to a capacitor and a manufacturing method thereof, and more particularly, to a capacitor with a capacitor element and a manufacturing method thereof.

2. Description of the Related Art

Unexamined Japanese Patent Publication No. 2006-294788 discloses a case-molded capacitor. This case-molded capacitor includes a plurality of capacitor elements connected by a bus bar with a terminal for external connection at one end, housed in a case and performed by resin molding except for at least the terminal of the above bus bar. The mold resin that performs the above resin molding is mainly epoxy resin, and includes hollow and spherical inorganic material at a range from 3 wt % to 25 wt %.

SUMMARY

A capacitor according to an aspect of the present disclosure includes a capacitor element and a protection film. The capacitor element includes a first end-face electrode, a second end-face electrode, and an outer peripheral surface. The second end-face electrode exists on the opposite side of the first end-face electrode. The outer peripheral surface exists between the first and second end-face electrodes. The protection film includes a first protection portion, a second protection portion, and a third protection portion. The first protection portion protects the periphery of the first end-face electrode. The second protection portion protects the periphery of the second end-face electrode. The third protection portion is connected to the first and second protection portions and protects the outer peripheral surface.

A method for manufacturing a capacitor according to an aspect of the present disclosure includes a preparation step, a winding step, and a fusion step. In the preparation step, a capacitor element including a first end-face electrode, a second end-face electrode existing on the opposite side of the first end-face electrode, and an outer peripheral surface existing between the first and second end-face electrodes is prepared. In the winding step, a protection film is wound around the outer peripheral surface of the capacitor element while protruding from both ends of the capacitor element. The protection film has a width longer than the distance between the first end-face electrode and the second end-face electrode. In the fusion step, a first protrusion portion in the protection film that protrudes from the first end-face electrode side is bent toward the first end-face electrode and fused to form the first protection portion that protects the periphery of the first end-face electrode, and a second protrusion portion in the protection film that protrudes from the second end-face electrode side is bent toward the second end-face electrode and fused to form the second protection portion that protects the periphery of the second end-face electrode.

According to the capacitor of the present disclosure, moisture absorption can be reduced while the capacitor is lightweight.

According to the method for manufacturing the capacitor of the present disclosure, it is possible to manufacture a capacitor that is lightweight and has excellent moisture resistance.

DETAILED DESCRIPTIONS OF EMBODIMENTS

Prior to the description of the exemplary embodiments, problems of the present disclosure are briefly described.

The case-molded capacitor of Unexamined Japanese Patent Publication No. 2006-294788 has a case and a mold resin filled in the case to reduce moisture absorption at the expense of weight reduction.

The present disclosure provides a capacitor that can reduce moisture absorption while being lightweight, and a method for manufacturing a capacitor capable of manufacturing such a capacitor.

1. Outline

The inventors of the present disclosure examined the path of moisture infiltration into the inside of the capacitor element, assuming that the case and the mold resin filled in the case are removed from the case-molded capacitor disclosed in Unexamined Japanese Patent Publication No. 2006-294788. As a result, they found that moisture tends to infiltrate through the boundary between the end-face of the wound body of a metalized film and the metallikon electrode. Thus, the inventors of the present disclosure conducted further research on the assumption that a case is not used, and as a result, they have come to develop capacitor 1 as follows.

Figure 1:
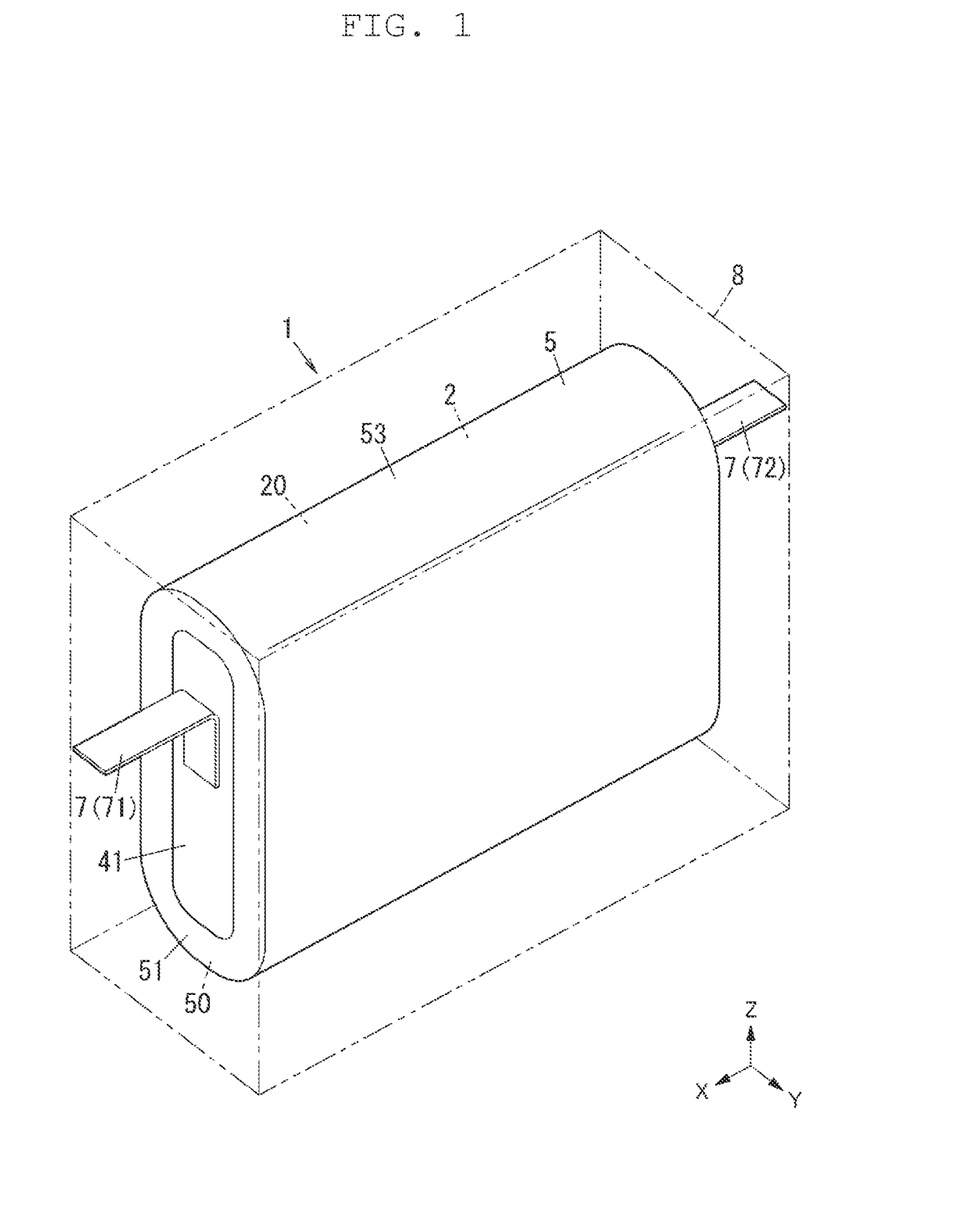
FIG. 1 is a transparent perspective view illustrating a capacitor according to a first exemplary embodiment.

That is, capacitor 1 according to the present exemplary embodiment includes capacitor element 2 and protection film 5, as shown in FIG. 1.

Figure 2A:
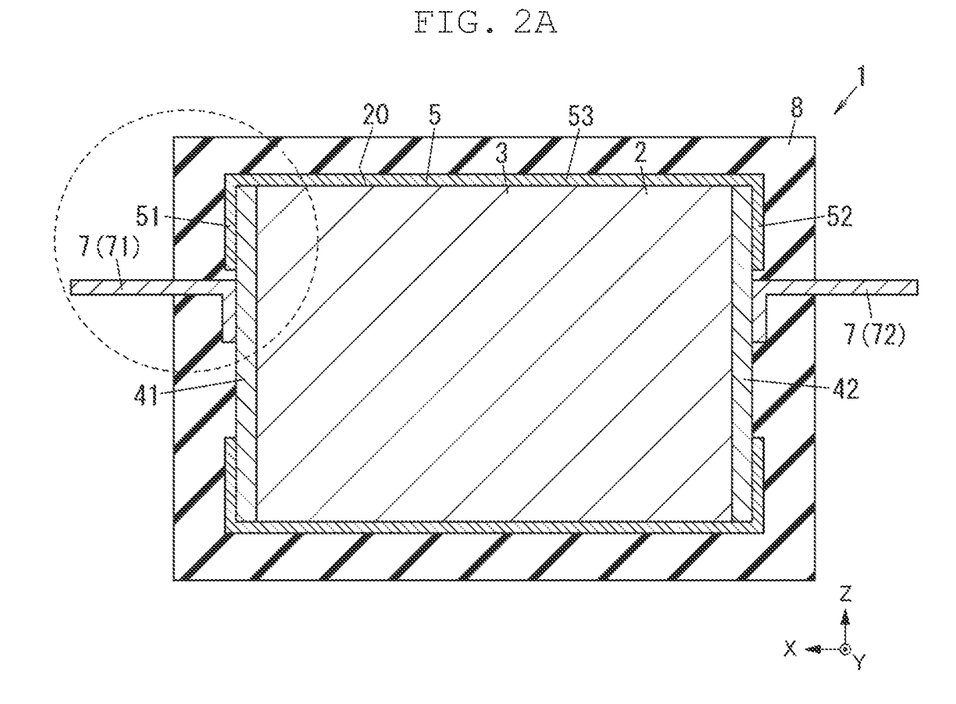
FIG. 2A is a schematic cross-sectional view illustrating the capacitor according to the first exemplary embodiment.

Capacitor element 2 includes first end-face electrode 41, second end-face electrode 42, and outer peripheral surface 20, as shown in FIG. 2A. Second end-face electrode 42 exists on the opposite side of first end-face electrode 41. Outer peripheral surface 20 exists between first end-face electrode 41 and second end-face electrode 42.

Protection film 5 includes first protection portion 51, second protection portion 52, and third protection portion 53, as shown in FIG. 2A. First protection portion 51 protects the periphery of first end-face electrode 41. Second protection portion 52 protects the periphery of second end-face electrode 42. Third protection portion 53 is connected to first protection portion 51 and second protection portion 52, and protects outer peripheral surface 20.

Figure 2B:
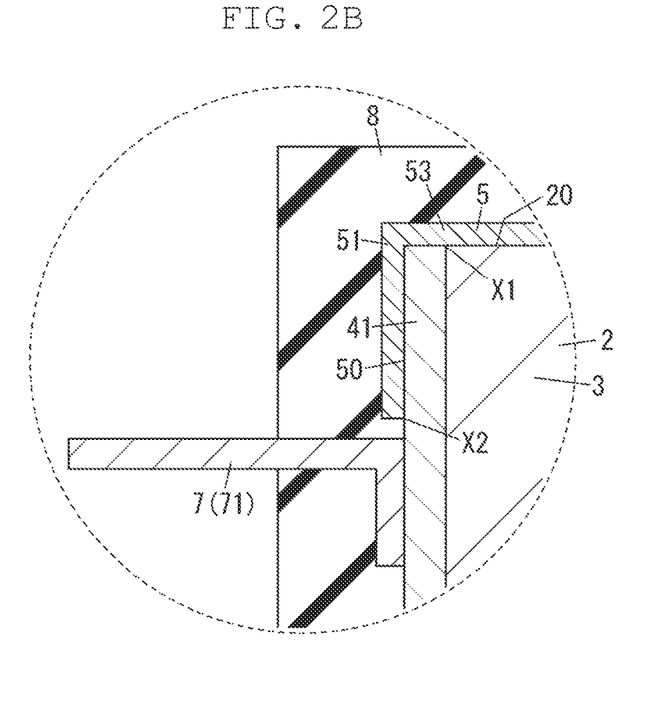
FIG. 2B is an enlarged view of the area enclosed by the broken line in FIG. 2A.

As shown in FIG. 2B, in the present exemplary embodiment, boundary portion X1 between body 3 of capacitor element 2 and first end-face electrode 41 is covered with protection film 5 (particularly third protection portion 53). This prevents moisture from infiltrating into the inside of body 3 of capacitor element 2 through boundary portion X1.

In the present exemplary embodiment, boundary portion X2 exists between first end-face electrode 41 and protection film 5 (particularly first protection portion 51), but the path from boundary portion X2 to boundary portion X1 is bent. Hence, even if moisture infiltrates through boundary portion X2, it is difficult for moisture to reach boundary portion X1. The same is true for second end-face electrode 42 side. Moreover, capacitor 1 does not require a case.

Thus, according to the present exemplary embodiment, moisture absorption can be reduced while the capacitor is lightweight.

2. Details

(1) First Exemplary Embodiment

(1.1) Capacitor

Hereinafter, capacitor 1 according to the first exemplary embodiment is described with reference to the drawings. For convenience in explaining positional relationships and the like, arrows indicating the X, Y, and Z axes, which constitute a three-dimensional orthogonal coordinate system, are indicated in the drawings, but these arrows are not accompanied by entities. Hereinafter, XY-plan view, YZ-plan view, and ZX-plan view mean the view along the Z-axis, X-axis, and Y-axial directions, respectively. The directions of the X, Y, and Z axes are examples and are not intended to limit the direction of capacitor 1 when capacitor 1 is manufactured or used.

FIGS. 1, 2A and 2B show capacitor 1 according to the present exemplary embodiment. Capacitor 1 is a so-called caseless capacitor. That is, unlike the case-molded capacitor of Unexamined Japanese Patent Publication No. 2006-294788, capacitor 1 does not require a case. This allows capacitor 1 to be lightweight.

Capacitor 1 includes capacitor element 2 and protection film 5. Capacitor 1 may further include bus bar 7 and seal portion 8.

<Capacitor Element>

First, capacitor element 2 is described. Capacitor element 2 in the present exemplary embodiment is a so-called wound capacitor element. Capacitor element 2 includes body 3, first end-face electrode 41, and second end-face electrode 42 (see FIG. 2A).

Body 3 has two end-faces (one facing the positive X-axis and the other facing the negative X-axis) and outer peripheral surface 20 that exists between these two end-faces. Specifically, body 3 is formed by overlapping two metalized films in which a metal, including aluminum, is deposited on a dielectric film, winding such overlapped metalized films, and pressing (pressing in the Y-axial direction) them into a flat shape. The cross-sectional shape of body 3 in the YZ-plan view is a rounded rectangular shape that is longer in the Z-axial direction than in the Y-axial direction. Body 3 has a columnar shape extending in the X-axial direction.

First end-face electrode 41 and second end-face electrode 42 are layered on the two end-faces of body 3, respectively. Thus, capacitor element 2 includes first end-face electrode 41, second end-face electrode 42, and outer peripheral surface 20. As is the case with body 3, the cross-sectional shape of capacitor element 2 in the YZ-plan view also has a rounded rectangular shape that is longer in the Z-axial direction than in the Y-axial direction (see FIG. 1). As is the case with body 3, capacitor element 2 also has a columnar shape extending in the X-axial direction.

First end-face electrode 41 exists on the surface of capacitor element 2 facing the positive X-axis. First end-face electrode 41 is formed of a metal, including zinc, by metallikon (metal spraying method).

Second end-face electrode 42 exists on the opposite side of first end-face electrode 41. That is, second end-face electrode 42 exists on the surface of capacitor element 2 facing the negative X-axis. Second end-face electrode 42 is formed in the same manner as first end-face electrode 41.

Outer peripheral surface 20 of capacitor element 2 is a surface that constitutes the outer periphery of capacitor element 2. Outer peripheral surface 20 includes outer peripheral surface 20 of body 3 and exists between first end-face electrode 41 and second end-face electrode 42.

<Protection Film>

Next, protection film 5 is described. Protection film 5 is a film having an electrically insulating property. Protection film 5 is preferably a film that is impermeable to moisture and fusible. Specifically, the material of protection film 5 is not limited, but includes polypropylene (PP), polyethylene (PE), polyvinyl chloride (PVC), or the like.

Protection film 5 includes first protection portion 51, second protection portion 52, and third protection portion 53.

First protection portion 51 covers and protects a portion of first end-face electrode 41. In particular, first protection portion 51 includes a portion of protecting the periphery of first end-face electrode 41. First protection portion 51 has a ring shape (see FIG. 1). Specifically, the outer peripheral edge of first protection portion 51 has a rounded rectangular shape that is longer in the Z-axial direction than in the Y-axial direction in the YZ-plan view. The inner peripheral edge of first protection portion 51 has a rounded rectangular shape that is one size smaller than the rounded rectangular shape formed by the outer peripheral edge of first protection portion 51. The portion between the outer and inner peripheral edges of first protection portion 51 corresponds to the periphery of first end-face electrode 41.

Second protection portion 52 covers and protects a portion of second end-face electrode 42. In particular, second protection portion 52 includes a portion protecting the periphery of second end-face electrode 42. Second protection portion 52 is similar to first protection portion 51. That is, second protection portion 52 also has a ring shape. Specifically, the outer peripheral edge of second protection portion 52 has a rounded rectangular shape that is longer in the Z-axial direction than in the Y-axial direction in the YZ-plan view. The inner peripheral edge of second protection portion 52 has a rounded rectangular shape that is one size smaller than the rounded rectangular shape formed by the outer peripheral edge of second protection portion 52. The portion between the outer and inner peripheral edges of second protection portion 52 corresponds to the periphery of second end-face electrode 42.

Third protection portion 53 is connected to first and second protection portions 51 and 52 and includes a portion that protects outer peripheral surface 20. Third protection portion 53 has a cylindrical shape. One opening edge (X-axis positive side) of third protection portion 53 is connected to the outer peripheral edge of first protection portion 51. The other opening edge (X-axis negative side) of third protection portion 53 is connected to the outer peripheral edge of second protection portion 52. Third protection portion 53 covers and protects outer peripheral surface 20 of capacitor element 2.

Protection film 5 includes fusion portion 50. Fusion portion 50 is the portion that is bonded by applying pressure after heating. That is, fusion is synonymous with welding.

In the present exemplary embodiment, fusion portions 50 exist on the entire inner surface of first protection portion 51 (the surface facing the negative X axis) and the entire inner surface of second protection portion 52 (the surface facing the positive X axis), respectively. Fusion portion 50 is bonded to first end-face electrode 41 and second end-face electrode 42. That is, the entire inner surface of first protection portion 51 is bonded to the periphery of first end-face electrode 41, and the entire inner surface of second protection portion 52 is bonded to the periphery of second end-face electrode 42.

<Bus Bar>

Bus bar 7 is a member having electric conductivity (metal member). Bus bar 7 is L-shaped in the ZX-plan view. Bus bar 7 includes first bus bar 71 and second bus bar 72.

First bus bar 71 is electrically connected to first end-face electrode 41. Specifically, first bus bar 71 is electrically connected to the surface of first end-face electrode 41 that is not protected by first protection portion 51 (the surface surrounded by the inner peripheral edge of first protection portion 51).

Second bus bar 72 is electrically connected to second end-face electrode 42. Specifically, second bus bar 72 is electrically connected to the surface of second end-face electrode 42 that is not protected by second protection portion 52 (the surface surrounded by the inner peripheral edge of second protection portion 52).

<Seal Portion>

Seal portion 8 is a member having an electrical insulation property. Seal portion 8 is preferably a member that is difficult for moisture to infiltrate. Specifically, a seal material used to form seal portion 8 is not limited, but includes epoxy resin, or the like.

Seal portion 8 seals the entire capacitor element 2. In the present exemplary embodiment, seal portion 8 is rectangular parallelepiped. First bus bar 71 protrudes from one end-face (the surface facing the positive X-axis) of seal portion 8. Second bus bar 72 protrudes from the other end-face (the surface facing the negative X-axis) of seal portion 8.

(1.2) Manufacturing Method

Next, a manufacturing method for capacitor 1 according to the present exemplary embodiment is described with reference to the drawings. A method for manufacturing capacitor 1 according to the present exemplary embodiment includes a preparation step, a winding step, and a fusion step. A method for manufacturing capacitor 1 may further include a bus bar connection step and a sealing step.

<Preparation Step>

Figure 3A:
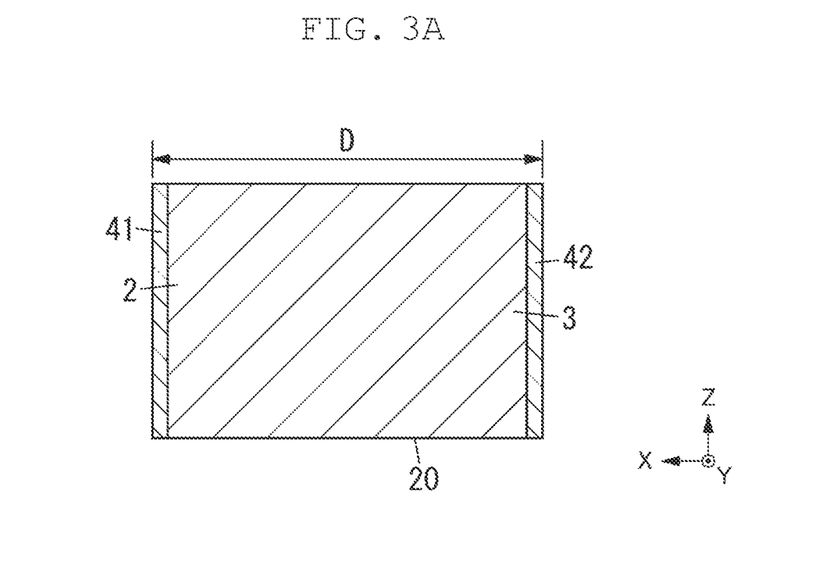
FIGS. 3A to 3D are schematic cross-sectional views illustrating a manufacturing process for the capacitor according to the first exemplary embodiment.

In the preparation step, capacitor element 2 is prepared as shown in FIG. 3A. Capacitor element 2 includes first end-face electrode 41, second end-face electrode 42, and outer peripheral surface 20, as described above. The length of capacitor element 2 in the X-axial direction (that is, the distance between first end-face electrode 41 and second end-face electrode 42, or in more detail, the distance in the X-axial direction between the surface of first end-face electrode 41 facing the positive X-axial direction and the surface of second end-face electrode 42 facing the negative X-axial direction) is denoted by D.

<Winding Step>

Figure 3B:
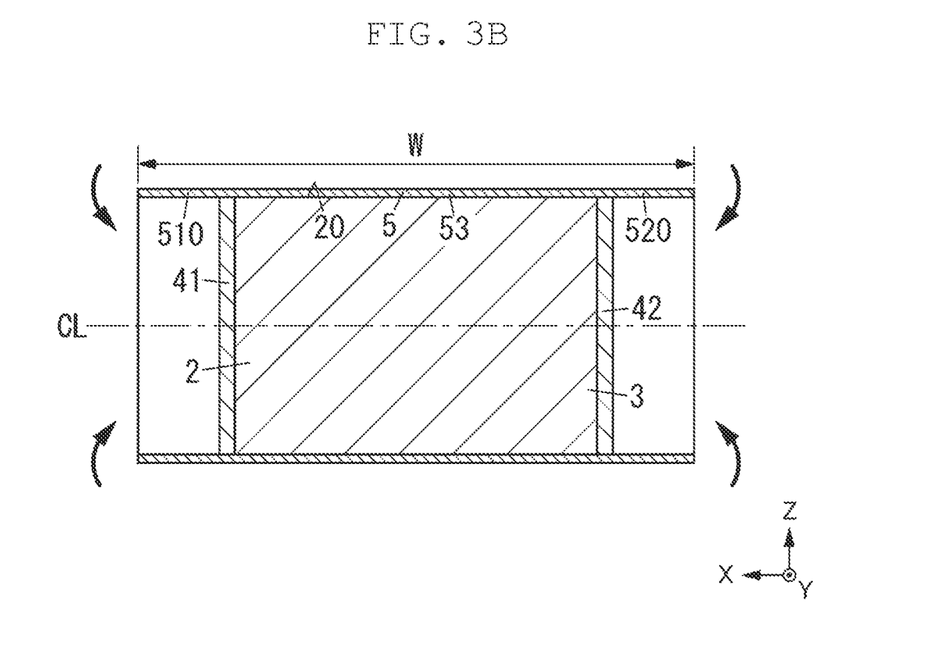

In the winding step, protection film 5 is wound around outer peripheral surface 20 of capacitor element 2 with a line CL connecting first end-face electrode 41 and second end-face electrode 42 as shown in FIG. 3B. The line CL connecting first end-face electrode 41 and second end-face electrode 42 is a virtual straight line parallel to the X-axis. Protection film 5 is a single sheet of film before being wound, as described above.

Protection film 5 includes first protrusion portion 510, second protrusion portion 520, and third protection portion 53.

First protrusion portion 510 is connected to one side edge (X-axis positive side) of third protection portion 53. When protection film 5 is wound around capacitor element 2, first protrusion portion 510 is the portion of protection film 5 that protrudes from first end-face electrode 41 side of capacitor element 2. In the step after winding (fusion step), first protrusion portion 510 becomes first protection portion 51.

Second protrusion portion 520 is connected to the other side edge (X-axis negative side) of third protection portion 53. When protection film 5 is wound around capacitor element 2, second protrusion portion 520 is the portion of protection film 5 that protrudes from second end-face electrode 42 side of capacitor element 2. In the step after winding (fusion step), second protrusion portion 520 becomes second protection portion 52.

Protection film 5 has a width W (see FIG. 3B). Width W is longer than length D in the X-axial direction of capacitor element 2 (distance D between first and second end-face electrodes 41 and 42). The difference between width W and distance D is equal to the sum of the lengths of first protrusion portion 510 and second protrusion portion 520 in the X-axial direction.

In the winding step, as shown in FIG. 3B, protection film 5 is wound around outer peripheral surface 20 of capacitor element 2 while allowing protection film 5 to protrude from both ends of capacitor element 2 (the ends on the positive and negative X-axis sides). Specifically, first protrusion portion 510 is made to protrude from the positive X-axis end of capacitor element 2. Second protrusion portion 520 is made to protrude from the negative X-axis end of capacitor element 2. Third protection portion 53 is disposed on outer peripheral surface 20 of capacitor element 2 and does not protrude from both ends of capacitor element 2.

By winding protection film 5 around outer peripheral surface 20 of capacitor element 2, protection film 5 is laminated toward the radially outer side direction of the virtual circle in the YZ plane centered on the virtual straight line CL. As a result, first protrusion portion 510 protrudes cylindrically from one end of capacitor element 2 in the positive direction of the X-axis. Similarly, second protrusion portion 520 protrudes cylindrically from the other end of capacitor element 2 in the negative direction of the X-axis.

The number of windings of protection film 5 is at least one or more, but is not limited. The number of windings is determined appropriately in consideration of the thickness of protection film 5 and other factors.

<Fusion Step>

Figure 3C:
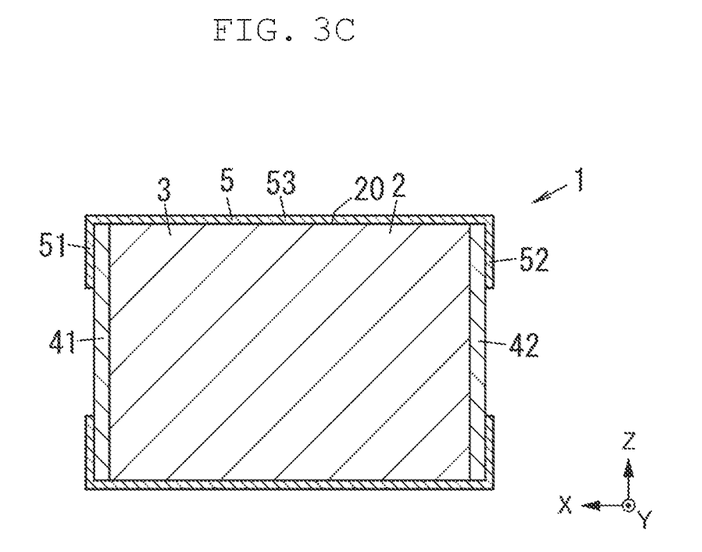

In the fusion step, first protrusion portion 510 is bent toward first end-face electrode 41 and fused to form first protection portion 51, as shown in FIG. 3C. Fusion (welding) includes thermal welding, hot plate welding, ultrasonic welding, laser welding, and the like.

Similarly, second protrusion portion 520 is bent toward second end-face electrode 42 and fused to form second protection portion 52.

Through the above steps, capacitor 1 according to the present exemplary embodiment is manufactured. The following steps are optional.

<Bus Bar Connection Step>

Figure 3D:
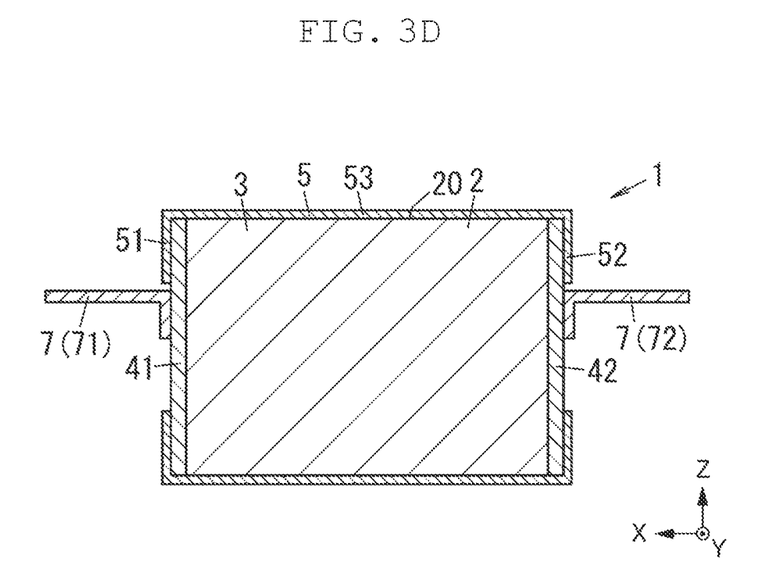

In the bus bar connection step, bus bar 7 is connected to capacitor 1, as shown in FIG. 3D. Specifically, first bus bar 71 is electrically connected to the surface of first end-face electrode 41 that is not protected by first protection portion 51. Further, second bus bar 72 is electrically connected to the surface of second end-face electrode 42 that is not protected by second protection portion 52. A method for connecting bus bar 7 to capacitor 1 is not limited, but includes, welding, soldering, and the like.

<Sealing Step>

In the sealing step, capacitor 1 to which bus bar 7 is connected is resin-sealed. That is, capacitor element 2 is placed in an appropriate mold, and the seal material (including thermosetting resin) is injected around the entire perimeter of capacitor element 2 to form seal portion 8. Thus, this manufactures capacitor 1 shown in FIG. 1. In FIG. 1, seal portion 8 is shown as an imaginary line.

(1.3) Functions and Effects

In the present exemplary embodiment, as shown in FIG. 2B, boundary portion X1 between body 3 of capacitor element 2 and first end-face electrode 41 is covered with protection film 5 (particularly third protection portion 53). This prevents moisture from infiltrating into the inside of body 3 of capacitor element 2 through boundary portion X1.

In the present exemplary embodiment, boundary portion X2 exists between first end-face electrode 41 and protection film 5 (particularly first protection portion 51), but fusion portion 50 exists in the path from boundary portion X2 to boundary portion X1. Therefore, fusion portion 50 facilitates the prevention of moisture infiltration. Furthermore, the path from boundary portion X2 to boundary portion X1 is bent. As a result, this makes it difficult for moisture to reach boundary portion X1 even if moisture infiltrates through boundary portion X2. The same is true for second end-face electrode 42 side. Moreover, capacitor 1 does not require a case.

Hence, according to capacitor 1 of the present exemplary embodiment, moisture absorption can be reduced while the capacitor is lightweight. Also, according to the manufacturing method for capacitor 1 of the present exemplary embodiment, it is possible to manufacture capacitor 1 that is lightweight and has excellent moisture resistance.

(2) Second Exemplary Embodiment

Next, capacitor 1 according to the second exemplary embodiment is described with reference to the drawings. In the second exemplary embodiment, the same reference marks as in the first exemplary embodiment may be attached to the same components as in the first exemplary embodiment to omit the detailed description.

Figure 4:
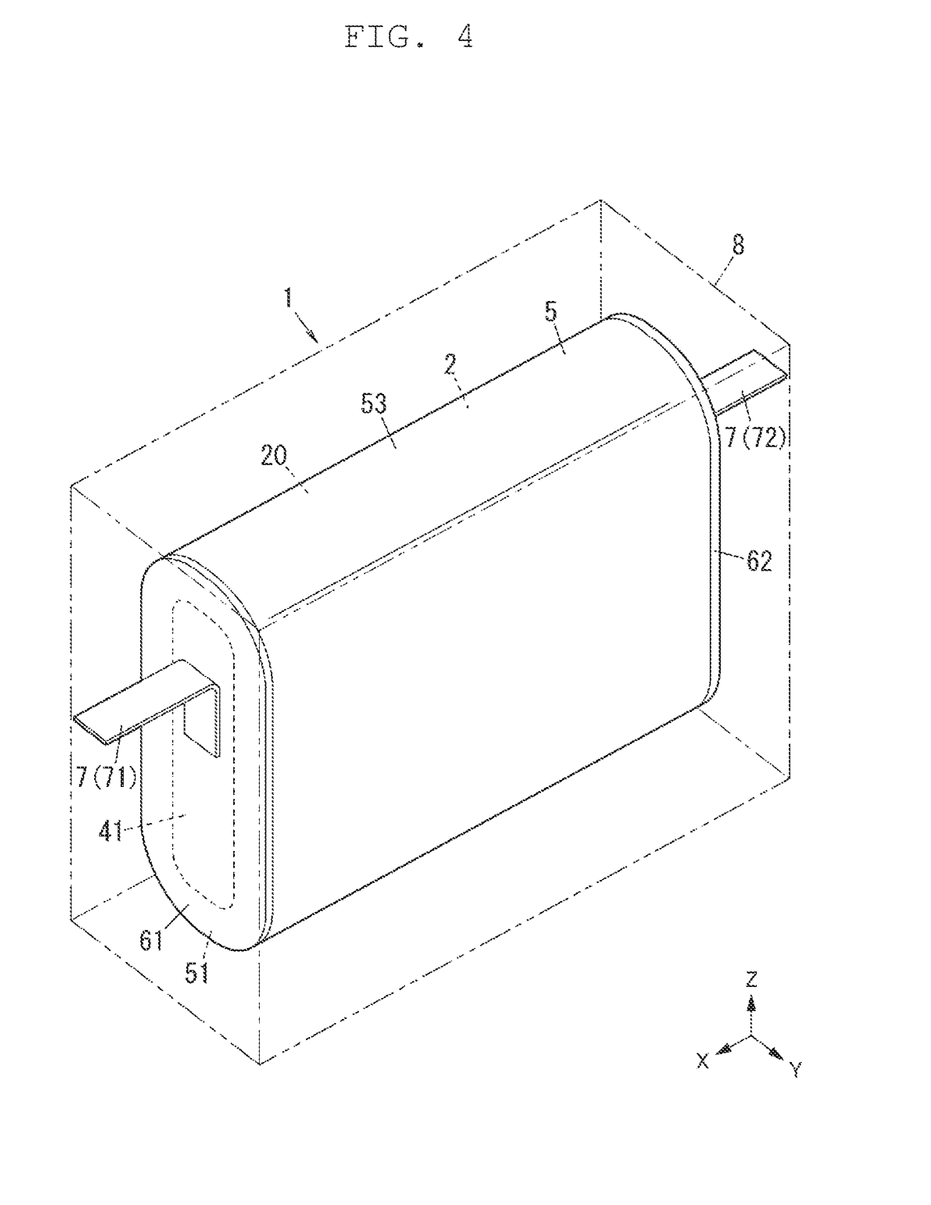
FIG. 4 is a transparent perspective view illustrating a capacitor according to a second exemplary embodiment.
Figure 5A:
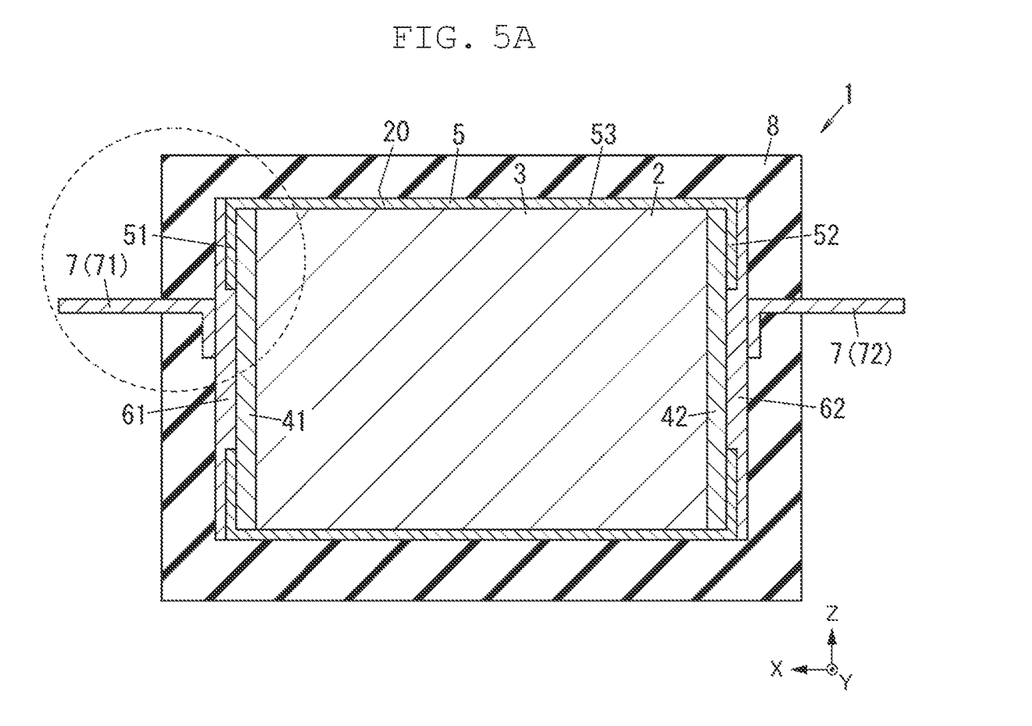
FIG. 5A is a schematic cross-sectional view illustrating the capacitor according to the second exemplary embodiment.
Figure 5B:
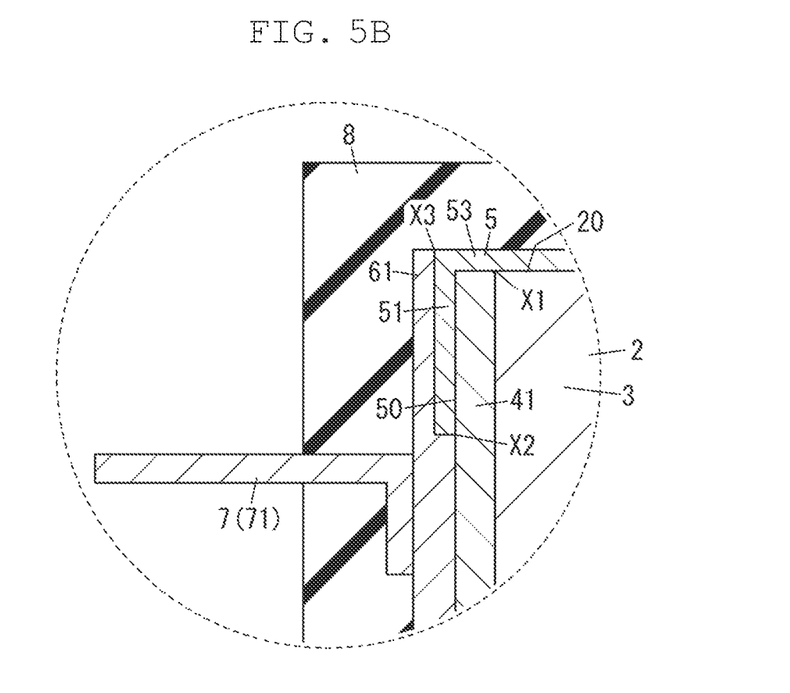
FIG. 5B is an enlarged view of the area enclosed by the broken line in FIG. 5A.

FIGS. 4, 5A and 5B show capacitor 1 according to the present exemplary embodiment. Capacitor 1 according to the present exemplary embodiment differs from capacitor 1 according to the first exemplary embodiment in that capacitor element 2 further includes first additional electrode 61 and second additional electrode 62.

(2.1) Capacitor

<Capacitor Element>

First additional electrode 61 is an electrode additionally provided on the first end-face electrode 41. In YZ-plan view, the outer peripheral edge of first additional electrode 61 is located outside the inner peripheral edge of first protection portion 51 (broken line in FIG. 1). That is, first additional electrode 61 covers first protection portion 51 and first end-face electrode 41 that is not protected by first protection portion 51. In particular, in the present exemplary embodiment, the outer peripheral edge of first additional electrode 61 coincides with the outer peripheral edge of first protection portion 51 in the YZ-plan view.

First additional electrode 61 is electrically connected to first end-face electrode 41. First additional electrode 61 is formed of a metal, including zinc, by metallikon (metal spraying method).

On the other hand, second additional electrode 62 is similar to first additional electrode 61. That is, second additional electrode 62 is an electrode additionally provided to second end-face electrode 42. In YZ-plan view, the outer peripheral edge of second additional electrode 62 is located outside the inner peripheral edge of second protection portion 52. That is, second additional electrode 62 covers second protection portion 52 and second end-face electrode 42 that is not protected by second protection portion 52. In particular, in the present exemplary embodiment, the outer peripheral edge of second additional electrode 62 coincides with the outer peripheral edge of second protection portion 52 in YZ-plan view.

In FIGS. 5A and 5B, the boundary lines between first additional electrode 61 and first end-face electrode 41 and between second additional electrode 62 and second end-face electrode 42 are illustrated for convenience of explanation, but these boundaries may not be visible in practice.

(2.2) Manufacturing Method

Next, the manufacturing method for capacitor 1 according to the present exemplary embodiment is described with reference to the drawings. The manufacturing method for capacitor 1 of the present exemplary embodiment differs from the manufacturing method for capacitor 1 of the first exemplary embodiment in that it further includes an additional electrode formation step.

<Additional Electrode Formation Step>

Figure 6A:
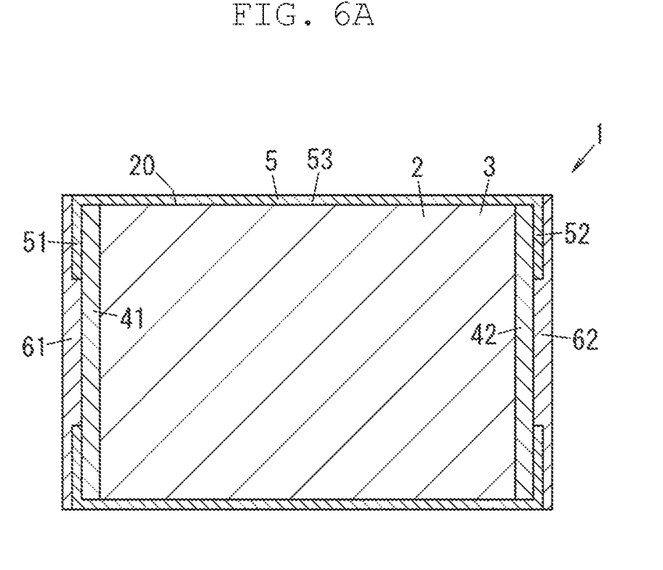
FIGS. 6A and 6B are schematic cross-sectional views illustrating a manufacturing process for the capacitor according to the second exemplary embodiment.

The additional electrode formation step is the step after the fusion step shown in FIG. 3C. In the additional electrode formation step, first and second additional electrodes 61 and 62 are formed by the metal spraying method, as shown in FIG. 6A.

Specifically, first additional electrode 61 is formed by spraying a metallic material onto first protection portion 51 and first end-face electrode 41 that is not protected by first protection portion 51. The metallic material is not limited, but includes zinc, or the like.

Similarly, second additional electrode 62 is formed by spraying a metallic material onto second protection portion 52 and second end-face electrode 42 that is not protected by second protection portion 52. The metallic material used to form second additional electrode 62 may be the same as or different from the metallic material used to form first additional electrode 61.

Through the above steps, capacitor 1 according to the present exemplary embodiment is manufactured. The following steps are optional.

<Bus Bar Connection Step>

Figure 6B:
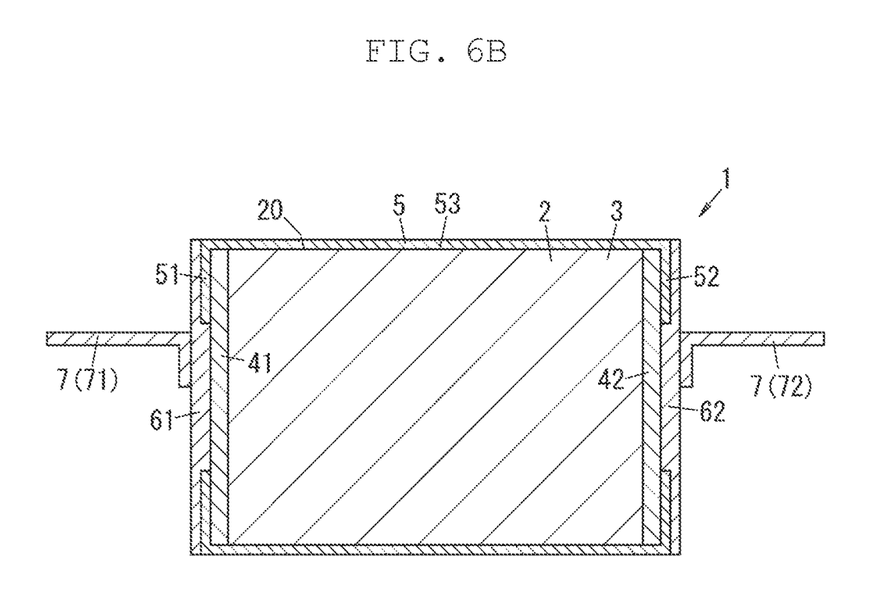

In the bus bar connection step, bus bar 7 is connected to capacitor 1, as shown in FIG. 6B. Specifically, first bus bar 71 is electrically connected to first additional electrode 61. Furthermore, second bus bar 72 is electrically connected to second additional electrode 62. The method for connecting bus bar 7 to capacitor 1 is not limited, but includes, welding soldering, and the like.

<Sealing Step>

In the sealing step, capacitor 1 to which bus bar 7 is connected is resin-sealed. That is, capacitor element 2 is placed in an appropriate mold, and the seal material (including thermosetting resin) is injected around the entire perimeter of capacitor element 2 to form seal portion 8. This manufactures capacitor 1 shown in FIG. 4. In FIG. 4, seal portion 8 is shown as an imaginary line.

(2.3) Functions and Effects

The present exemplary embodiment basically has the same functions and effects as the first exemplary embodiment. That is, in the present exemplary embodiment, as shown in FIG. 5B, boundary portion X1 between body 3 of capacitor element 2 and first end-face electrode 41 is covered with protection film 5 (particularly third protection portion 53). This prevents moisture from infiltrating into the inside of body 3 of capacitor element 2 through boundary portion X1.

Also, in the present exemplary embodiment, boundary portion X2 exists between first end-face electrode 41 and protection film 5 (particularly first protection portion 51), but fusion portion 50 exists in the path from boundary portion X2 to boundary portion X1. Therefore, fusion portion 50 facilitates the prevention of moisture infiltration.

In the present exemplary embodiment, unlike the first exemplary embodiment, boundary portion X3 exists between first additional electrode 61 and protection film 5 (particularly first protection portion 51), but the path from boundary portion X3 to boundary portion X1 via boundary portion X2 is more bent than in the first exemplary embodiment. As a result, even if moisture infiltrates through boundary portion X3, it is even more difficult for moisture to reach boundary portion X1. The same is true for second end-face electrode 42 side. Moreover, capacitor 1 does not require a case.

Therefore, according to capacitor 1 of the present exemplary embodiment, moisture absorption can be reduced while the capacitor is lightweight. Also, according to the manufacturing method for capacitor 1 of the present exemplary embodiment, it is possible to manufacture capacitor 1 that is lightweight and has excellent moisture resistance.

3. Variations

In the above exemplary embodiment, capacitor element 2 is a wound capacitor element, but it may also be a laminated capacitor element.

In the above exemplary embodiment, the inner surface of first protection portion 51 is bonded to first end-face electrode 41 and the inner surface of second protection portion 52 is bonded to second end-face electrode 42, but the inner peripheral surface of third protection portion 53 may further be bonded to outer peripheral surface 20 of capacitor element 2. That is, fusion portion 50 may be present on at least a portion of the inner peripheral surface of third protection portion 53.

In the above exemplary embodiment, fusion portions 50 exist on the entire inner surface of first protection portion 51 and the entire inner surface of second protection portion 52, respectively, but fusion portions 50 may exist to form a closed curve. That is, fusion portion 50 of first protection portion 51 may exist on the inner surface of first protection portion 51 to form a closed curve surrounding the inner peripheral edge of first protection portion 51 and surrounded by the outer peripheral edge of first protection portion 51. Similarly, fusion portion 50 of second protection portion 52 may also exist on the inner surface of second protection portion 52 to form a closed curve surrounding the inner peripheral edge of second protection portion 52 and surrounded by the outer peripheral edge of second protection portion 52.

In the above exemplary embodiment, the shape and size of first and second bus bars 71 and 72 are the same, but may be different.

In the above exemplary embodiment, the protruding directions of first and second bus bars 71 and 72 are opposite, but the protruding directions of first and second bus bars 71 and 72 may be in the same direction and are not limited.

In the above exemplary embodiment, seal portion 8 has a rectangular parallelepiped shape, but seal portion 8 may have a three-dimensional shape other than rectangular parallelepiped.

In the second exemplary embodiment, the outer peripheral edge of first additional electrode 61 coincides with the outer peripheral edge of first protection portion 51, but it is not limited as long as it is outside the inner peripheral edge of first protection portion 51. That is, although boundary portion X3 exist on the outer peripheral edge of first protection portion 51, boundary portion X3 may exist between the outer and inner peripheral edges of first protection portion 51 in the surface of first protection portion 51 facing the positive X-axis. The same is true for second additional electrode 62.

4. Aspects

As is apparent from the above exemplary embodiment and variations, the present disclosure includes the following aspects. In the following, reference marks are given in parentheses only to clarify the correspondence relationship with the exemplary embodiment.

A first aspect is capacitor (1), comprising capacitor element (2) and protection film (5). Capacitor element (2) includes first end-face electrode (41), second end-face electrode (42), and outer peripheral surface (20). Second end-face electrode (42) exists on the opposite side of first end-face electrode (41). Outer peripheral surface (20) exists between first end-face electrode (41) and second end-face electrode (42). Protection film (5) includes first protection portion (51), second protection portion (52), and third protection portion (53). First protection portion (51) protects the periphery of first end-face electrode (41). Second protection portion (52) protects the periphery of second end-face electrode (42). Third protection portion (53) is connected to first protection portion (51) and second protection portion (52) and protects outer peripheral surface (20).

According to this aspect, moisture absorption can be reduced while the capacitor is lightweight.

A second aspect is capacitor (1) based on the first aspect. In the second aspect, a part of protection film (5) is fusion portion (50). Fusion portion (50) is bonded to first end-face electrode (41) and second end-face electrode (42).

According to this aspect, moisture absorption can be further reduced.

A third aspect is capacitor (1) based on the first or second aspect. In the third aspect, capacitor element (2) further includes first additional electrode (61) and second additional electrode (62). First additional electrode (61) covers first protection portion (51) and a part of first end-face electrode (41) that is not protected by first protection portion (51). Second additional electrode (62) covers second protection portion (52) and a part of second end-face electrode (42) that is not protected by second protection portion (52).

According to this aspect, moisture absorption can be further reduced.

A fourth aspect is a method for manufacturing capacitor (1), comprising a preparation step, a winding step, and a fusion step. In the preparation step, capacitor element (2) is prepared including first end-face electrode (41), second end-face electrode (42) existing on the opposite side of first end-face electrode (41), and outer peripheral surface (20) existing between first end-face electrode and (41) and second end-face electrode (42). In the winding step, protection film (5) is wound around outer peripheral surface (20) of capacitor element (2) while protruding from both ends of the capacitor element. Protection film (5) has width (W) longer than distance (D) between first end-face electrode (41) and second end-face electrode (42). In the fusion step, first protrusion portion (510) in protection film (5) that protrudes from first end-face electrode (41) side is bent toward first end-face electrode (41) and fused to form first protection portion (51) that protects the periphery of first end-face electrode (41), and second protrusion portion (520) in protection film (5) that protrudes from second end-face electrode (42) side is bent toward second end-face electrode (42) and fused to form second protection portion (52) that protects the periphery of second end-face electrode (42).

According to this aspect, it is possible to manufacture capacitor (1) that is lightweight and has excellent moisture resistance.

A fifth aspect is a method for manufacturing capacitor (1) based on the fourth aspect. The fifth aspect further includes an additional electrode formation step. In the additional electrode formation step, first additional electrode (61) is formed by spraying a metallic material onto first protection portion (51) and a part of first end-face electrode (41) that is not protected by first protection portion (51), and second additional electrode (62) is formed by spraying a metallic material onto second protection portion (52) and a part of second end-face electrode (42) that is not protected by second protection portion (52).

According to this aspect, it is possible to manufacture capacitors with even better moisture resistance.

What is claimed is:

1. A capacitor comprising:
a capacitor element;
a protection film;
a first bus bar;
a second bus bar; and
a seal portion covering the capacitor element that is covered by the protection film, wherein:
the capacitor element includes:
an element body having a first end-face, a second end-face on an opposite side of the first end-face, and an outer peripheral surface between the first end-face and the second end-face,
a first end-face electrode disposed on the first end-face, and
a second end-face electrode disposed on the second end-face,
the first bus bar is connected to the first end-face electrode,
the second bus bar connected to the second end-face electrode,
the protection film includes a first protection portion covering a surface of the first end-face electrode that faces the first end-face, a second protection portion covering a surface of the second end-face electrode that faces the second end-face, and a third protection portion connecting the first protection portion and the second protection portion and covering the outer peripheral surface, and
the seal portion is in contact with a part of the first end-face electrode that is not covered by the protection film and a part of the second end-face electrode that is not covered by the protection film.

2. The capacitor according to claim 1, wherein:
a part of the first protection portion is bonded to the first end-face electrode, and
a part of the second protection portion is bonded to the second end-face electrode.

3. The capacitor according to claim 1, wherein:
the capacitor element further includes a first additional electrode and a second additional electrode,
the first additional electrode covers the first protection portion and a part of the first end-face electrode that is not covered by the first protection portion, and
the second additional electrode covers the second protection portion and a part of the second end-face electrode that is not covered by the second protection portion.

4. The capacitor according to claim 1, wherein:
the protection film covers a periphery of the first end-face electrode at a boundary between the first end-face and the outer peripheral surface, and a periphery of the second end-face electrode at a boundary between the second end-face and the outer peripheral surface.

5. The capacitor according to claim 1, wherein:
the first protection portion is in contact with the first end-face electrode,
the second protection portion is in contact with the second end-face electrode, and
the third protection portion is in contact with the outer peripheral surface.

* * * * *